United States Patent
Vogel

(10) Patent No.: US 6,286,196 B1
(45) Date of Patent: Sep. 11, 2001

(54) PROCESS FOR FASTENING COMPONENTS ON A HALLOW SHAFT

(75) Inventor: Manfred Vogel, Kappelrodeck (DE)

(73) Assignee: Erich Neumayer GmbH & Co. KG, Hausach (DE)

( * ) Notice: Subject to any disclaimer, the term of this patent is extended or adjusted under 35 U.S.C. 154(b) by 0 days.

(21) Appl. No.: 09/352,205

(22) Filed: Jul. 13, 1999

(30) Foreign Application Priority Data

Jul. 13, 1998 (DE) .............................................. 198 31 333

(51) Int. Cl.⁷ ...................................................... B23D 17/00
(52) U.S. Cl. ...................... 29/421.1; 29/888.1; 29/522.1; 29/523; 72/58; 72/370.06
(58) Field of Search ................................ 29/523, 888.1, 29/512, 421.1, 522.1, 888.08; 285/382.4, 382.5; 72/58, 370.06

(56) References Cited

U.S. PATENT DOCUMENTS

| | | | |
|---|---|---|---|
| 3,869,938 | * | 3/1975 | Schlotterbeck et al. ............... 74/567 |
| 4,382,390 | * | 5/1983 | Jordan ................................... 74/567 |
| 4,612,695 | * | 9/1986 | Umeha et al. ......................... 29/505 |
| 5,101,554 | * | 4/1992 | Breuer et al. ....................... 29/888.1 |
| 5,172,483 | * | 12/1992 | Yocono, Sr. et al. .................. 33/528 |
| 5,220,727 | * | 6/1993 | Hochstein ........................... 29/888.1 |

FOREIGN PATENT DOCUMENTS

| | | |
|---|---|---|
| 3807817 | 3/1989 | (DE) . |
| 0 257 175 | 3/1988 | (EP) . |

* cited by examiner

Primary Examiner—S. Thomas Hughes
Assistant Examiner—John C. Hong

(57) ABSTRACT

The invention relates to a process for fastening components on a hollow shaft (1), during which process the components (21, 22, 23), exhibiting an opening, are put into specified positions on the hollow shaft (1) and for the purpose of fastening components (21, 22, 23) the hollow shaft (1) is expanded by introducing a pressure medium. Support matrices (3) are arranged only between the components (21, 22, 23) for the purpose of bracing the regions of the hollow shaft (1) between the components (21, 22, 23) during the expansion operation.

9 Claims, 1 Drawing Sheet

PROCESS FOR FASTENING COMPONENTS ON A HALLOW SHAFT

BACKGROUND OF THE INVENTION

Field of the Invention

The present invention relates to a process for fastening components on a hollow shaft, in particular to manufacture a constructed cam shaft, according to a process for fastening cam components on a hollow shaft in which the cam components are put into specified positions on the hollow shaft and the hollow shaft is expanded by introducing a pressure medium in order to fasten the cam components onto the shaft.

The EP C257175 B1 discloses a process for the manufacture of a constructed cam shaft, where the components are fastened on the outer periphery of a pipe by introducing an expanding mandrel into the pipe. The shell of said expanding mandrel has at least two pairs of sealing rings, whereby the distance between the two sealing rings of each pair of sealing rings is equivalent to the axial stretch of the respective fastening place for a component. The pairs of sealing rings are spaced apart on the expanding mandrel in accordance with the spacing of the components on the pipe. Each pair of sealing rings forms an expanding space between its two sealing rings, said expanding space being connected to a central pressure channel of the expanding mandrel by means of a connecting channel. When the pressure medium is introduced into the central pressure channel, the result is a targeted expansion of the pipe between the sealing rings of a pair of sealing rings in order to fasten the components. The problem with this process is that first of all the expanding mandrel is complicated in its construction and secondly also comparatively difficult to handle, because it has to be accurately oriented relative to the fastening sites.

The EP 0257175 B1 also describes a process, wherein the use of an expanding mandrel can be avoided, according to FIG. 1, by laying the pipe into the central cavity of a matrix, which comprises two halves of a matrix that can be clamped together. Prior to laying the pipe into the matrix, the components are arranged on it. To receive these components, the matrix has suitable recesses. The components are heated and/or the pipe is cooled so that a temperature differential is produced.

Through the temperature differential a further shrink fitting of the components on the pipe takes place, when fastening the components through expansion of the entire pipe. It is easy to see that such a process is relatively time consuming and, therefore, cost intensive, because, on the one hand, the matrix is complicated on account of the need to provide recesses to receive the components; and, on the other hand, producing different temperatures at the pipe or the components is also complicated and expensive. The fastening procedure requires such an interaction between the expansion operation of the pipe and the shrink fitting of the heated components on the deformed pipe areas that in the area of the components the components rest against the inner surfaces of the same.

SUMMARY OF THE INVENTION

The object of the present invention is to provide a process for the purpose of fastening components on a hollow shaft, wherein, on the one hand, the components shall be fastened reliably and, on the other hand, the process shall be comparatively simple and economical.

This problem is solved by a process which the support matrices are arranged between the components for the purpose of bracing the regions of the hollow shaft between the components during expansion of the shaft.

The important advantage of the present invention lies in the fact that components can be fastened relatively simply and inexpensively on a hollow shaft without the need for expensive matrices and additional cost intensive shrink fitting operations, which require the heating of the components and/or cooling of the hollow shaft.

One important advantage of a special embodiment of the process of the invention lies in the fact that with a special development of the support matrices simultaneously with the fastening of the components on the hollow shaft a bearing between two adjacent components can be produced outside the shell of the hollow shaft. This has the advantage of avoiding the drawbacks with respect to the stability of the hollow shaft; said shortcomings occur during the manufacture of such a bearing directly on the shell of the hollow shaft due to machining or grinding operations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention and its embodiments shall be explained in detail with reference to the figures in the following.

DETAILED DESCRIPTION OF THE INVENTION

The invention was the result of the following considerations. The prevailing manufacture of a constructed cam shaft, where the entire, preassembled cam shaft is arranged in a specially designed matrix and is subsequently expanded with the use of hydraulic pressure in the area of the preassembled components, during which process the components are simultaneously heated and/or the hollow shaft is cooled in order to obtain with the temperature equalization an additional holding force by shrink fitting the components on the hollow shaft for the purpose of fastening by expanding the hollow shaft in the region of the components, is problematic because the manufacture of the necessary special matrix, which must receive the entire preassembled cam shaft, is very expensive, because the preassembled cams are offset with respect to each other in the circumferential direction on the hollow shaft. Therefore, such a displacement is also necessary in the matrix for the recesses, to be provided for the components to be received. The heating of the components and/or the cooling of the hollow shaft is associated with other cost intensive and expensive operations. In connection with the present invention it was now recognized for the first time that during the hydraulic expansion of the entire hollows shaft it is enough to provide support matrices only in the areas between two adjacent components. This has the advantage that the support matrix can be constructed quite simply, since it does not have to exhibit any recesses to receive components. In addition to the support matrix, there is only a need for holding devices that lock the individual components in specific positions in the circumferential direction. In realizing this process it turned out that it is not necessary to intensify the shrink fitting by heating and/or cooling.

Figure 1:
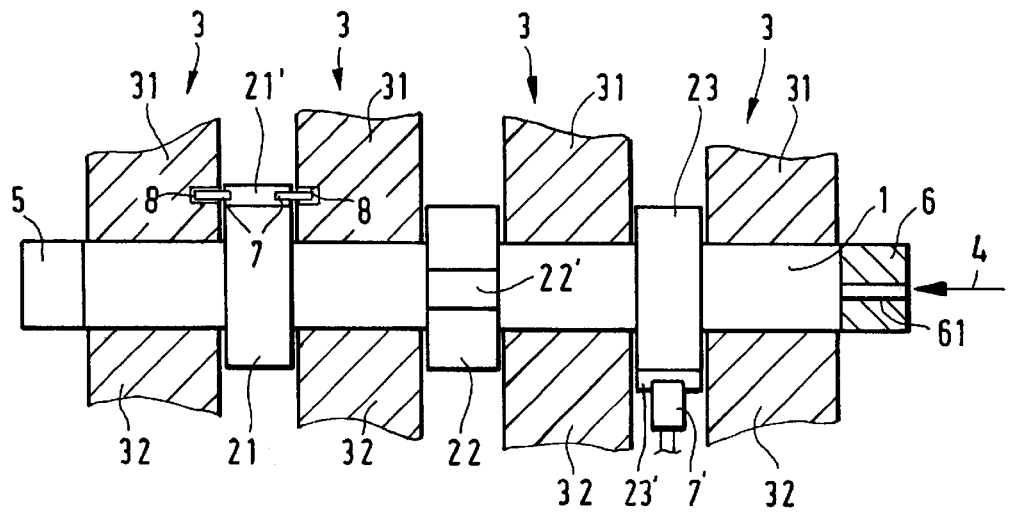
FIG. 1 shows a drawing to explain the process of the invention.

In FIG. 1 a hollow shaft is marked with the reference numeral 1. On this hollow shaft there are components 21, 22, 23, spaced apart in the longitudinal direction of the hollow shaft 1. The hollow shaft 1 is in particular a cam shaft and the components 21, 22, 23 are cams, which are offset from each other by a specific angle in the circumferential direction. The actual cam faces of the components 21, 22 and 23 are marked with the reference numerals 21', 22', 23'.

Figure 2:
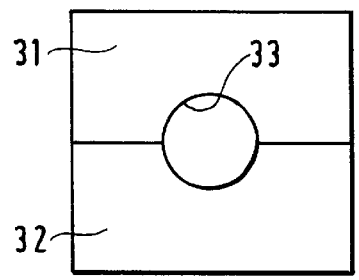
FIG. 2 shows the preferred construction of a support matrix.

The procedure for fastening the components 21, 22, 23 on the hollow shaft 1 is as follows. First, the components 21, 22 and 23 are slid on the hollow shaft 1 and put into specific axial positions on the hollow shaft 1. Then matrices 3, which brace the shell of the hollow shaft 1 in the regions between the components, are inserted in the spaces between the components 21, 22 or 22, 23. For example each support matrix 3 of FIG. 2 comprises two matrix sections 31, 32, which enclose a circular opening 33 when they are put together; the diameter of the opening 33 is dimensioned in such a manner that the inner wall of the opening 33 rests against the outer surface of the hollow shaft 1. For specific applications it can also be expedient to have a specific amount of clearance between the inner wall and the outer surface. The length of the support matrix 3 is preferably dimensioned in such a manner that it supports in essence the bulk of the space. It is also conceivable to construct the matrix 3 out of several matrix sections, instead of two halves 31, 32, in order to form the opening 33.

After the components 21, 22, 23 have been put into the specified positions in the circumferential direction and held in these positions, both ends of the hollow shaft 1 are sealed. At one end the shaft is sealed with a plug, as indicated by the reference numeral 5 in the schematic. To the other end is attached, for example, a connecting piece 6, through whose channel 61 a pressure medium is brought into the hollow shaft 1, as indicated by the reference numeral 4. The consequence is that the hollow shaft 1 is expanded in the region of the components 21, 22, 23, thus producing a permanent connection between the components 21, 22, 23 and the hollow shaft 1. The support matrices 3 provide that the hollow shaft 1 does not remain in the expanded state in the area between the components 21, 22, 23 or that this expansion is limited to some specified degree. In this manner the undesired deformations of the hollow shaft are avoided.

Preferably support matrices 3 are also arranged between the respective outsides of the outer components 21, 23 and the ends of the hollow shaft 1.

Figure 3:
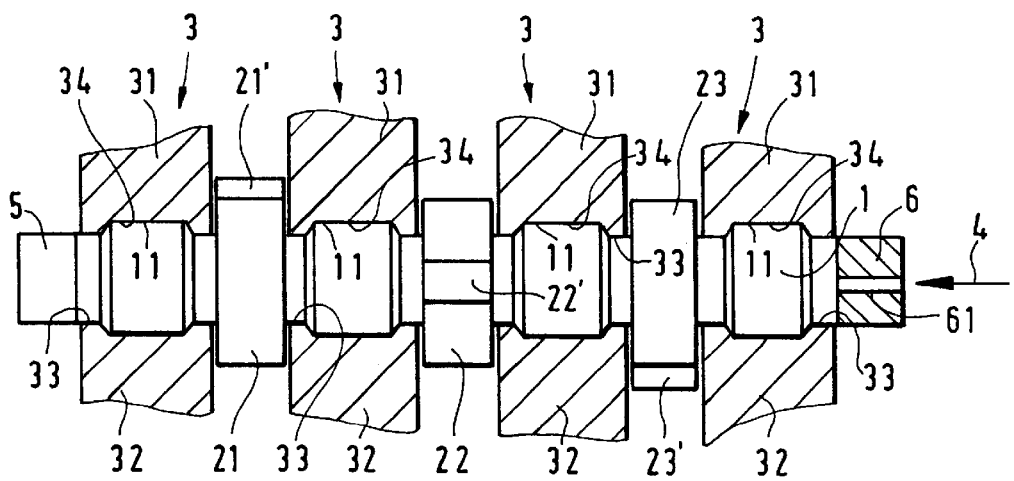
FIG. 3 depicts one embodiment of the process of the invention.

FIG. 3 shows an embodiment, in which a bearing in the region between two components 21, 22 or 22, 23 is produced in an especially advantageous manner through a special design of the matrices 3 simultaneously with the fastening of the components 21, 22, 23 on the hollow shaft 1. To this end the interior surfaces of the openings 33 of the support matrices 3 exhibit circumferential depressions 34, which render it possible during the expansion process to expand the hollow shaft 1 in the region of these circumferential depressions 34 of the matrices 3, so that this region of the hollow shaft 1 exhibits a raised bearing shoulder 11, which can be machined in such an extremely simple manner following fastening of the components 21, 22, 23 on the hollow shaft 1 and the removal of the same from the matrices 3 during the machining or grinding operation that the result is a smooth concentric bearing surface for arranging the bearing rings for supporting the hollow shaft 1. The manufacture of the bearings in this manner has the advantage that during the manufacture of the same with grinding technology there is no need to penetrate with a tool, such as a turning tool or an abrasive compound, directly into the shell of the hollow shaft, in order to produce there a concentric bearing. The use of a tool directly on the surface of the hollow shaft would produce notches, which would have harmful effects on the stability and also, for example, on the bending property of the hollow shaft.

The aforementioned holding devices, which adjust the components 21, 22, 23 in the circumferential direction, can be formed preferably by adjusting and locating pins 7, which are inserted into the appropriate axial boreholes 8 of the sides of the support matrices 3 facing the components, in such a manner that one eccentric region 21', 22' or 23' of the components 21, 22, 23 is held between at least two pins 7.

It is also conceivable according to FIG. 1 that the holding devices are adjusting and locating devices 7', which can be introduced independently of the support matrices 3 and from the outside into the spaces of two adjacent support matrices 3, in order to adjust and lock in position the eccentric regions 21', 22' or 23' of the components 21, 22 or 23 in the circumferential direction. For example, such adjusting and locating devices 7' can be fork-shaped parts, which envelop the eccentric regions 21', 22', 23' from the outside, when they are in the specified positions.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A process for fastening components on a hollow shaft, during which process the components are put into specified positions on the hollow shaft and expanding the hollow shaft by introducing a pressure medium for the purpose of fastening components to the hollow shaft said process comprising the steps of:

arranging a plurality of support matrices on said hollow shaft between each of the components for the purpose of bracing regions of the hollow shaft between each of the components during the expansion operation;

forming the support matrices with matrix sections by placing said matrix sections together around said hollow shaft; said matrix sections forming a circular opening with a specified clearance between an inner wall of the formed support matrices and an outer surface of the hollow shaft; and forming circumferential depressions on the inner wall of the formed support matrices, said circumferential depressions enabling the hollow shaft to be expanded in the region of the circumferential depressions, for the purpose of producing bearing shoulders in the regions of the hollow shaft between the components.

2. A process, as claimed in claim 1, further comprising the step of:

arranging said support matrices between respective end regions of the hollow shaft and the outer components.

3. A process, as claimed in claim 1, further comprising the step of:

dimensioning a length of the support matrices in such a manner that the support matrices brace a bulk of a region between two of said components.

4. Process, as claimed in claim 1, characterized in that the support matrices (3) consist of two halves (31,32).

5. A process, as claimed in claim 1, further comprising the steps of:

producing on said circumferential depressions of the support matrices, a smooth concentric surface by means of machining operations whereby during said expansion of said hollow shaft a raised bearing shoulder being produced in the circumferential depressions of the support matrices.

6. A process, as claimed in claim 1, further comprising the step of:

providing adjusting and locating means on the sides of the support matrices, facing the components and fixing the components, located in the positions, in the circumferential direction in specified positions.

7. A process, as claimed in 6, further comprising the steps of:

providing axial boreholes on the sides of the support matrices facing each of the components, and in the specified positions engage from the outside with eccentric regions of the components;

forming said adjusting and locating means into pins; and placing said adjusting and locating pins into said axial boreholes and fixing the components in position on said hollow shaft.

8. A process, as claimed in 6, further comprising the step of:

providing, independently of the support matrices, the adjusting and locating devices and from the outside into the spaces between two adjacent support matrices.

9. A process, as claimed in claim 1, further comprising the step of:

producing, on said circumferential depressions of the support matrices, a smooth concentric surface by grinding operations whereby during said expansion of said hollow shaft a raised bearing shoulder being produced in the circumferential depressions of the support matrices.

* * * * *